(No Model.) 3 Sheets—Sheet 1.
F. E. BUTTON.
SUBWAY FOR ELECTRIC RAILWAYS.
No. 533,631. Patented Feb. 5, 1895.
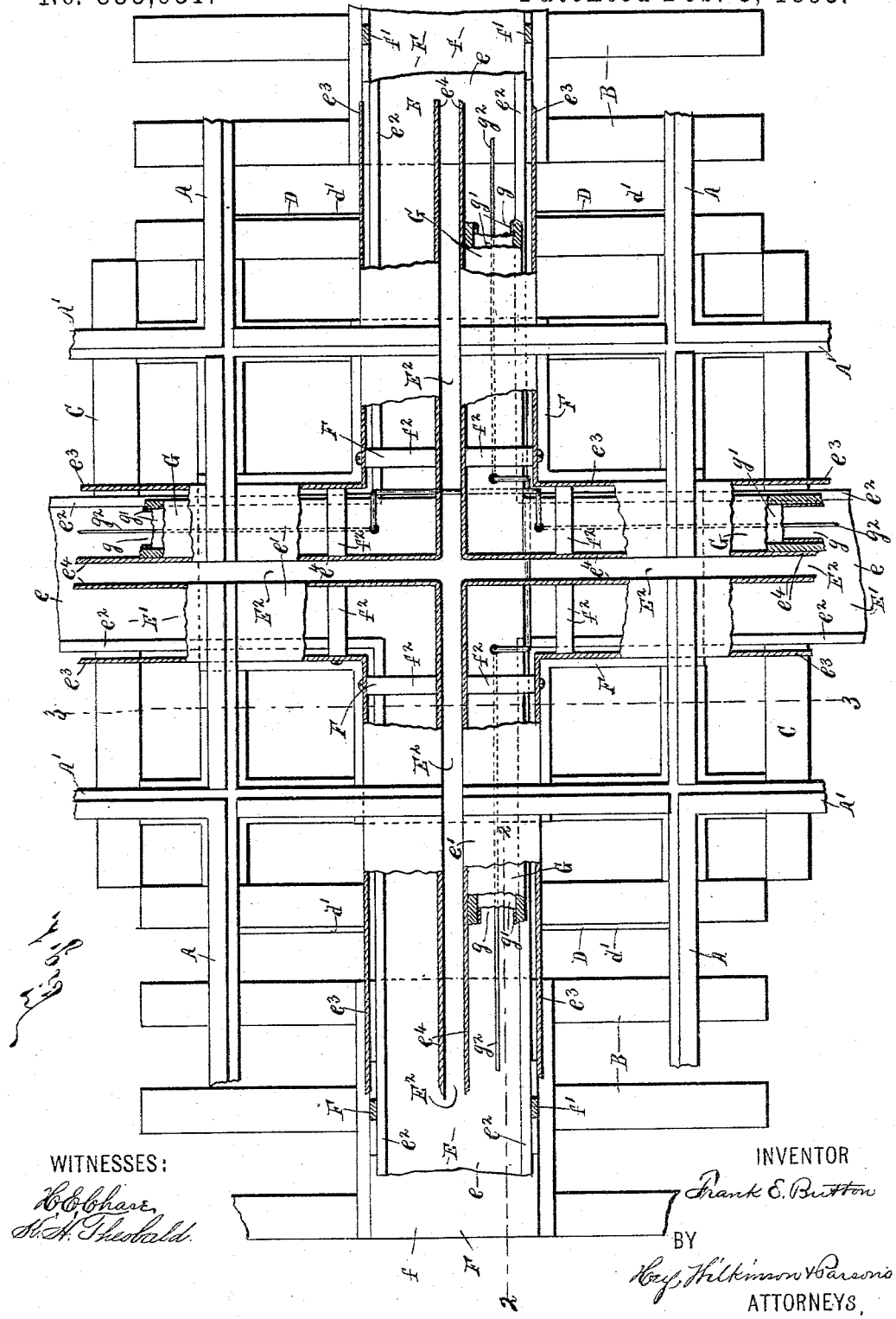
WITNESSES:
INVENTOR
Frank E. Button
BY
ATTORNEYS.

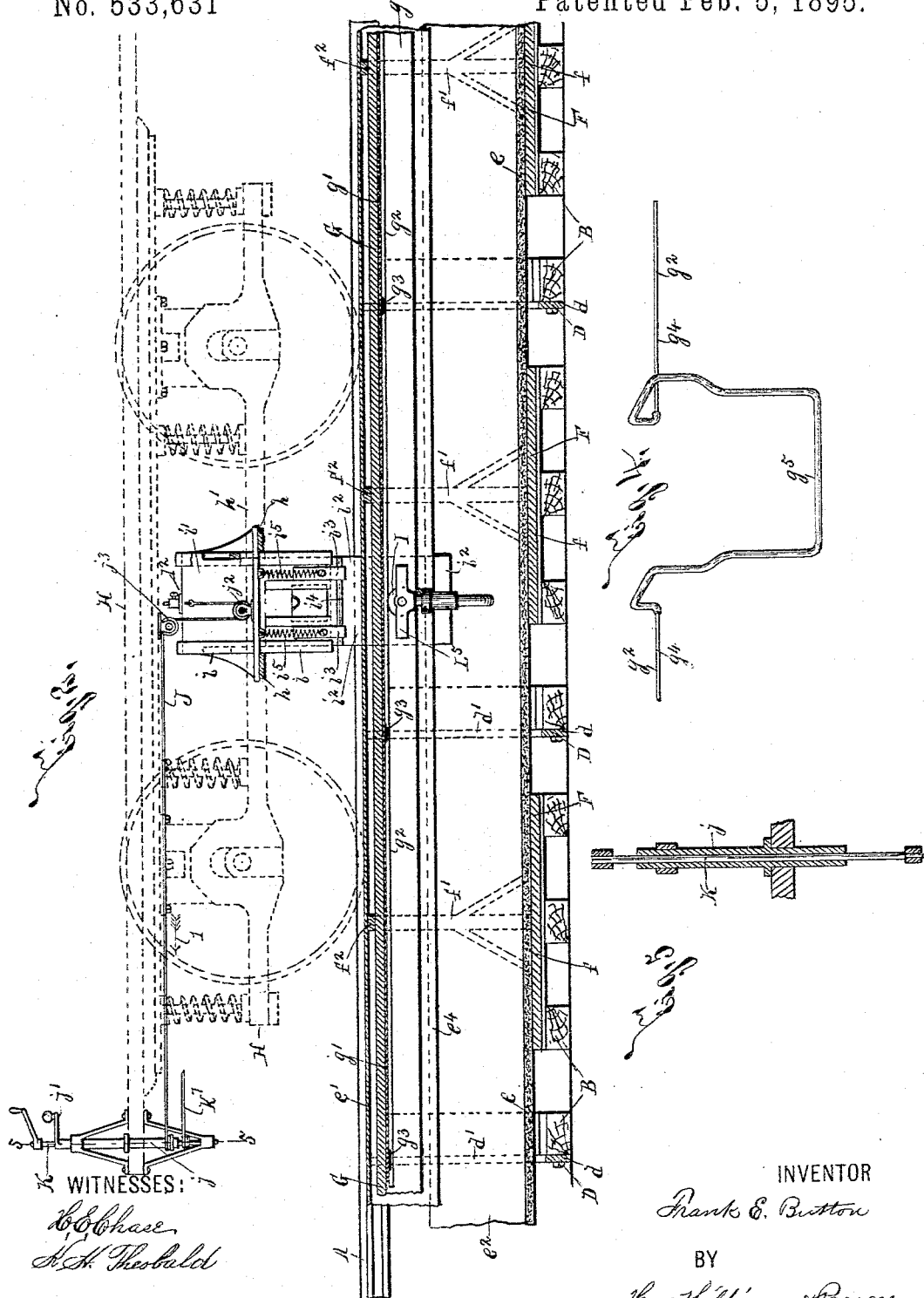

(No Model.) 3 Sheets—Sheet 3.
F. E. BUTTON.
SUBWAY FOR ELECTRIC RAILWAYS.
No. 533,631. Patented Feb. 5, 1895.
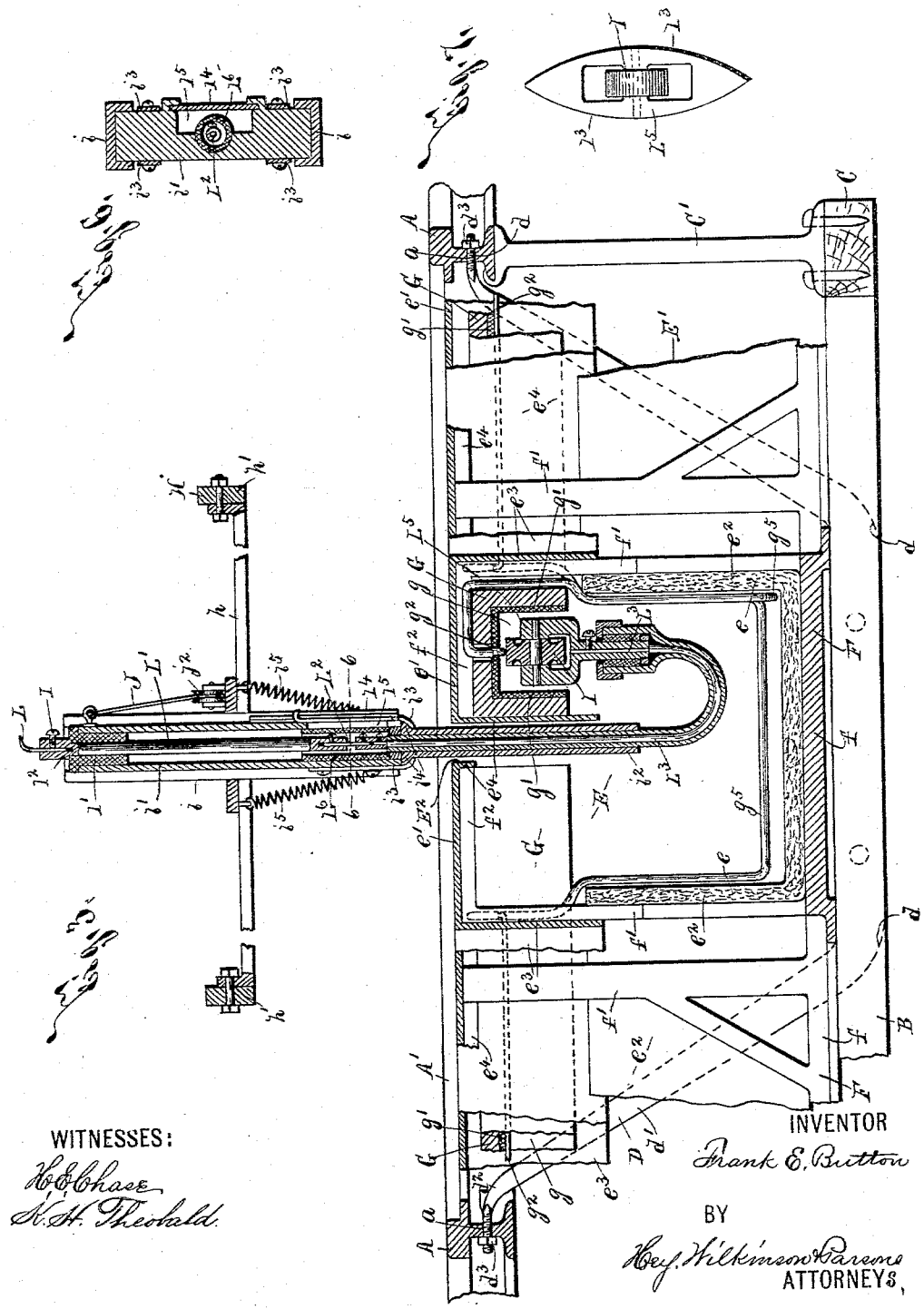
WITNESSES:
H. E. Chase
K. H. Theobald
INVENTOR
Frank E. Button
BY
Hy. Wilkinson & Parsons
ATTORNEYS

UNITED STATES PATENT OFFICE.

FRANK E. BUTTON, OF ROCHESTER, NEW YORK.

SUBWAY FOR ELECTRIC RAILWAYS.

SPECIFICATION forming part of Letters Patent No. 533,631, dated February 5, 1895.

Application filed June 6, 1894. Serial No. 513,650. (No model.)

*To all whom it may concern:*

Be it known that I, FRANK E. BUTTON, of Rochester, in the county of Monroe, in the State of New York, have invented new and useful Improvements in Subways, of which the following, taken in connection with the accompanying drawings, is a full, clear, and exact description.

My invention relates to improvements in sub-ways particularly applicable for electric railway systems, and has for its object the production of a simple and practical device, which supports the conductor beneath the rails in such position as to obviate all liability of undue contact therewith and consequent danger, and conducts the current practically and effectively to the vehicle or car passing along the rails; and to this end it consists, essentially, in the general construction and arrangement of its component parts, all as hereinafter more particularly described and pointed out in the claims.

In describing this invention, reference is had to the accompanying drawings, forming a part of this specification, in which like letters indicate corresponding parts in all the views.

Figure 1 is a top plan view, partly in section, of the adjacent portions of sub-ways and corresponding tracks crossing each other at an angle. Fig. 2 is a longitudinal vertical sectional view, taken on line 2—2, Fig. 1, showing a portion of one of the tracks, and a vehicle or car truck indicated partly by full and partly by dotted lines arranged in operative position upon the track. Fig. 3 is a transverse vertical sectional view, taken on line 3—3, Fig. 1, a portion of the frame of the truck, the trolley wheel, and the support for the trolley wheel being illustrated in operative position for holding the trolley wheel in engagement with its electric conductor. Fig. 4 is an isometric view of a portion of one of the electric conductors suitable for crossing a sub-way arranged at an angle with the sub-way provided therewith. Fig. 5 is a vertical sectional view, taken on line 5—5, Fig. 2. Fig. 6 is a transverse sectional view, taken on line 6—6, Fig. 3; and Fig. 7 is a top plan view of the enlarged extremity or shoe of the upturned end of the trolley wheel.

A A, A' A' are the opposite rails of two tracks meeting or crossing each other at an angle, and B C are cross and longitudinal sleepers provided with upright chairs C' of any suitable construction for supporting said rails. The rails are also supported by tie bars D arranged at intervals along the same and provided with downwardly deflected central portions $d$ suitably secured to the sleepers B, and upwardly extending extremities $d'$ secured to the adjacent rails A A, A' A'. As here illustrated, the upwardly extending extremities $d'$ $d'$ are formed with lateral ends $d^2$ passed through perforations $a$ in the rails A A, A' A', and provided with adjustable shoulders $d^3$ bearing against the outer faces of said rails.

E E' are sub-ways which are arranged longitudinally between the rails A A, A' A', and each consist of a lower section $e$ and an upper section composed of longitudinal divisions $e'$ $e'$ having their adjacent sides separated for forming a groove or slot $E^2$ entering the sub-way. The lower sub-way sections $e$ are provided with upturned walls $e^2$ $e^2$ at their longitudinal sides, and are mounted upon the central portions or foot pieces $f$ of suitable brackets F supported upon the sleepers B. The central portions or foot pieces $f$ of the brackets F are of sufficient length to rest upon a series of the cross sleepers B, and each of the brackets F is provided with upwardly extending arms $f'$ $f'$ having their lower extremities enlarged and arranged at the outside of the upturned walls $e^2$ $e^2$ of the sub-way sections $e$. The upper extremities of said arms are provided with lateral ends $f^2$ $f^2$ extending toward each other and having their adjacent edges separated.

The sub-way divisions $e'$ $e'$ are mounted upon the lateral ends $f^2$ $f^2$ of the brackets F, and are formed with depending walls $e^3$ $e^3$ at their outer sides arranged at the outside of the upper extremities of the arms $f'$ $f'$, and the inner longitudinal sides of said divisions are formed with similar walls $e^4$ $e^4$ arranged at the inside of the inner edges of the lateral ends $f^2$ $f^2$ of said bracket arms $f'$ $f'$, and having their adjacent faces separated from each other. The lower sub-way sections and the divisions of the upper sub-way sections may be formed of cast iron or other desirable material, and are suitably secured to the brackets F, but I have deemed it unnecessary to illustrate any construction of fastening means for said purpose, as the same will be obvious to one skilled in the art.

G G are supporting rails, preferably formed of wood and suitably secured beneath corresponding divisions of the upper sub-way sections between the inner and outer walls $e^3$ $e^4$ thereof. The supporting rails G are formed with longitudinal grooves $g$ in their lower faces, and are provided with insulating linings $g'$ arranged within the grooves $g$ and electric conductors $g^2$ supported beneath the longitudinal central portions of said linings by suitable clips $g^3$. The peculiar construction and arrangement of the supporting rails G and the conductors $g^2$ protect the conductors from rain, dust, &c. Each of the conductors $g^2$ is formed with opposite sections or arms $g^4$ arranged on opposite sides of the conductor disposed at an angle therewith and extended upwardly through the corresponding insulating lining $g'$ and supporting rail G, and with a loop $g^5$ connecting said sections or arms $g^4$ and extending downwardly into close proximity to the upper face of the central portion of the corresponding lower sub-way section.

Vehicles or cars of any suitable construction are movable along the rails A A, A' A', and at Fig. 2 I have illustrated by dotted lines the supporting frame or truck H of such a vehicle. These vehicles are provided with a trolley wheel I and a support therefor, which is secured to the supporting frame H in any well known manner, and holds the trolley wheel I in contact with the conductor $g^2$. In the exemplification of my invention, here illustrated, I have shown the upper end of the support for the trolley wheel I as secured to cross bars $h$ $h$ supported by lower longitudinal rails $h'$ $h'$ of the supporting frame or truck H, and its lower end as movable within the corresponding groove or slot $E^2$ and provided with an upturned extremity carrying the trolley wheel I.

The trolley wheel I is of any desirable construction, and is movable within the groove $g$ of the supporting rail G along the conductor $g^2$. The support for said trolley wheel consists of upper and lower sections; the upper section being composed of a division $i$ fixed to the supporting frame or truck H, and a second division $i'$ guided up and down in the division $i$. The lower section $i^2$ of the trolley wheel support is flexibly secured to the movable division $i'$ of the upper section thereof by flat springs or bars $i^3$ having their lower ends engaged with rounding shoulders $i^4$ upon the adjacent portion of the section $i^2$ and their upper ends suitably secured to the section $i'$.

The peculiar connection of the section $i^2$ and the division $i'$ flexibly connects said parts and permits the lower section $i^2$ of the trolley wheel support to separate from the upper section $i'$ when the vehicle provided therewith leaves the rails, and thus protects the conduit from injury.

Suitable spiral springs $i^5$ having their upper ends secured to the fixed division $i$ and their lower ends to the springs or bars $i^3$ operate to normally elevate the division $i'$ of the upper section of the trolley wheel support and the lower section of said support for holding the trolley wheel I in contact with its conductor $g^2$. The trolley wheel is connected to its conductor by a flexible connection J as a cord or cable having one end secured to a rotary sleeve $j$ supported by the frame or truck H and provided with a crank $j'$, and its other end secured to the movable division $i'$ and passed over guide wheels $j^2$ $j^3$ arranged one above the other and secured respectively to the fixed section $i$ of the trolley wheel support and the supporting frame or truck H. As the connection J is moved in the direction indicated by arrow 1, at Fig. 2, by the rotation of the sleeve $j$ the movable division of the trolley wheel support and the lower section of said support are drawn downwardly against the action of the springs $i^5$, and the trolley wheel is separated from its conductor $g^2$. The revoluble brake spindle K for the vehicle provided with my invention may be passed through the sleeve $j$, and a suitable connection $k'$ may be secured to the spindle K and connected to the brake mechanism, not necessary to herein illustrate or describe.

The conductor L connected to the trolley wheel I is secured by suitable fastening means $l$ to the upper end of a conducting bar or rod L' arranged within an internal chamber of the movable division $i'$ of the trolley wheel support. The upper end of the bar or rod L' is passed through an insulating bushing $l'$, and is provided with a shoulder $l^2$ resting upon the top face of said bushing, and its lower end is connected by a fuse $L^2$ to an insulated conductor $L^3$, which is passed through the lower section of the trolley wheel support and forms the greater portion of the upturned extremity thereof. The upturned extremity of the conductor $L^3$ is secured to a conducting frame $L^5$ in which the trolley wheel is journaled, and the upper end of this frame is formed with a shoe or enlargement having pointed extremities and inclined or curved longitudinal sides $l^3$. The fuse $L^2$ is more or less liable to burn out, and is readily broken when the car leaves the track, and, in order to permit of ready access thereto, the movable division $i'$ of the trolley wheel support is provided with a sliding plate $l^4$ of any desirable form, size, and construction for closing an opening $l^5$ in the wall of said division. A sliding insulating sleeve $L^6$ may surround the fuse $L^2$ for preventing the entrance of dust, &c., thereto.

The operation of my invention will be readily perceived upon reference to the foregoing description and the accompanying drawings, and it will be particularly noted that the rails are firmly supported and tied together, the sub-way readily constructed, the trolley wheel and its conductor arranged at one side of the slot or groove entering the sub-way, and so supported that they are constantly in contact, even though the vehicle carrying the trolley wheel is movable laterally to a limited extent, and that the trolley wheel is readily detached from its conductor when desired.

The detail construction and arrangement of my invention may be considerably varied without departing from the spirit thereof, and hence I do not herein specifically limit myself to such exact detail construction and arrangement.

Having thus fully described my invention, what I claim as new, and desire to secure by Letters Patent, is—

1. The combination with opposite rails, a cross-sleeper arranged beneath the rails, and a tie bar having a downwardly deflected central portion secured to the cross-sleeper, and upwardly extending extremities secured to the rails, substantially as and for the purpose described.

2. The combination with opposite rails provided with perforations, a cross-sleeper arranged beneath the rails, and a tie-bar having a downwardly deflected central portion secured to the cross-sleeper, and upwardly extending extremities having lateral ends passed through the perforations of the rails and provided with adjustable shoulders bearing against the outer faces of the rails, substantially as and for the purpose specified.

3. The combination with opposite rails, cross sleepers arranged beneath the rails and tie bars having downwardly deflected central portions secured to the cross sleepers, and upwardly extending extremities secured to the rails, of the lower section of a sub-way interposed between the rails and mounted on the deflected central portions of the tie bars, and the upper sections of the sub-way consisting of longitudial divisions having their adjacent sides separated for forming a groove or slot entering the sub-way, substantially as and for the purpose described.

4. The combination with opposite rails, cross sleepers arranged beneath the rails, and tie bars having downwardly deflected central portions secured to the cross sleepers, and upwardly extending extremities secured to the rails, of the lower section of a sub-way interposed between the rails and mounted on the deflected central portions of the tie bars, a series of brackets between the rails supported by the cross sleepers, and the upper section of the sub-way consisting of longitudinal divisions mounted on said brackets and having their adjacent sides separated for forming a groove or slot entering the sub-way, substantially as and for the purpose described.

5. The combination with opposite rails, a series of brackets having a central foot piece and opposite upwardly extending arms, the lower section of a sub-way interposed between said arms and mounted on the foot piece, and the upper section of a sub-way consisting of longitudinal divisions mounted on said arms and having their adjacent sides separated for forming a groove or slot entering the sub-way, substantially as and for the purpose set forth.

6. The combination with opposite rails, a series of brackets interposed between the rails and having a central foot piece and opposite upwardly extending arms provided with lateral ends extending toward each other, the lower section of a sub-way interposed between said arms and mounted on the foot piece, and the upper section of the sub-way consisting of longitudinal divisions provided with depending walls at their outer and inner sides, their outer walls being arranged at the outside of the upper extremities of the arms and their inner walls being arranged at the inside of the inner edges of the lateral ends of said arms and being separated from each other for forming a groove or slot entering the sub-way, substantially as and for the purpose described.

7. The combination with opposite rails, a series of cross sleepers beneath the rails, a tie-bar having a downwardly deflected central portion secured to one of the cross-sleepers and upwardly extending extremities secured to the rails, brackets interposed between the rails and mounted upon the cross-sleepers and having a central foot piece and opposite upwardly extending arms, the lower section of a sub-way interposed between said arms and mounted on the foot piece, and the upper section of the sub-way consisting of longitudinal divisions mounted on said arms and having their adjacent sides separated for forming a groove or slot entering the sub-way, substantially as and for the purpose specified.

8. The combination with opposite rails, the lower section of a sub-way interposed between the rails, a series of brackets interposed between the rails, the upper section of the sub-way consisting of longitudinal divisions mounted on said brackets and having their adjacent sides separated for forming a groove or slot entering the sub-way, and a supporting rail arranged beneath one of said divisions and formed with a longitudinal groove in its lower face, substantially as and for the purpose set forth.

9. The combination with opposite rails, of a series of brackets having a central foot piece and opposite upwardly extending arms, the lower section of a sub-way interposed between said arms and mounted on the foot piece, and the upper section of a sub-way consisting of longitudinal divisions mounted on said arms and having their adjacent sides separated for forming a groove or slot entering the sub-way, and a supporting rail arranged beneath one of said divisions and formed with a longitudinal groove in its lower face, substantially as and for the purpose specified.

10. The combination with opposite rails, a series of cross sleepers beneath the rails, and a tie bar having a downwardly deflected central portion secured to one of the cross-sleepers and upwardly extending extremities secured to the rails, of brackets interposed between the rails and mounted upon the cross-sleepers and having a central foot piece and opposite upwardly extending arms, the lower section of a sub-way interposed between said arms and mounted on the foot piece, and the upper section of the sub-way consisting of longitudinal divisions mounted on said arms and having their adjacent sides separated for forming a groove or slot entering the sub-way, a supporting rail arranged beneath one of said divisions and formed with a longitudinal groove in its lower face, an insulating lining for the groove and an electric conductor beneath the lining supported within the groove, substantially as and for the purpose described.

11. The combination with opposite rails, a series of brackets interposed between the rails and having a central foot piece and opposite upwardly extending arms provided with lateral ends extending toward each other, the lower section of a sub-way interposed between said arms and mounted on the foot piece, the upper section of the sub-way consisting of longitudinal divisions provided with depending walls at their outer and inner sides, their outer walls being arranged at the outside of the upper extremities of the arms and their inner walls being arranged at the inside of the inner edges of the lateral ends of said arms and being separated from each other for forming a groove or slot entering the sub-way, a supporting rail arranged beneath one of said divisions between the outer and inner walls thereof and provided with a longitudinal groove in its lower face, and an electric conductor supported within the groove, substantially as and for the purpose described.

12. The combination with pairs of opposite rails crossing each other at an angle, and a series of brackets interposed between the rails and having a central foot-piece and opposite upwardly extending arms provided with lateral ends extending toward each other; of the lower sections of sub-ways arranged at an angle with each other and interposed between said arms and mounted on the foot-pieces of the brackets, the upper sections of the sub-ways each consisting of longitudinal divisions provided with depending walls at their outer and inner sides, their outer walls being arranged at the outside of the upper extremities of the arms of the brackets and their inner walls being arranged at the inside of the inner edges of the lateral ends of said arms and being separated from each other for forming a groove or slot entering the sub-way, supporting rails arranged beneath corresponding divisions of the upper sub-way sections and each provided with a longitudinal groove in its lower face, electric conductors supported within the grooves and each provided with opposite sections or arms extending upwardly through the corresponding supporting rail, and a loop connecting said sections arranged at the outside of said rail and extending beneath the same, the lower central portion of one loop being arranged above the corresponding portion of the other loop, substantially as set forth.

13. The combination with a sub-way provided with a longitudinal groove or slot, and an electric conductor supported within the sub-way at one side of the groove or slot; of the supporting frame of a vehicle, a trolley wheel movable along the conductor within the sub-way, a support for the trolley wheel consisting of an upper section secured to said supporting frame, and formed with a movable division and a lower section having one end flexibly connected to the movable division of the former section and its opposite end guided in said groove or slot and provided with an upturned extremity carrying the trolley wheel, and a spring for elevating the lower section and forcing the trolley wheel against the conductor, substantially as specified.

14. The combination with a sub-way provided with a longitudinal groove or slot, and an electric conductor supported within the sub-way at one side of the groove or slot; of the supporting frame of a vehicle, a trolley wheel movable along the conductor within the sub-way, a support for the trolley wheel consisting of an upper section secured to said supporting frame and formed with a movable division, and a lower section having one end flexibly connected to the former section and its opposite end guided in said groove or slot and provided with an upturned extremity formed with an enlarged end or shoe carrying the trolley wheel, and a spring for elevating the lower section and forcing the trolley wheel against the conductor, substantially as and for the purpose described.

15. The combination with a sub-way provided with a longitudinal groove or slot, and an electric conductor supported within the sub-way at one side of the groove or slot; of the supporting frame of a vehicle, a trolley wheel movable along the conductor within the sub-way, a support for the trolley wheel consisting of an upper section composed of a fixed division, and a second division reciprocally movable along the former division, and a lower section having one end flexibly connected to the second division of the former section and its opposite end guided in the groove or slot and provided with an upturned extremity carrying the trolley wheel, means for reciprocating the movable division of the former section of said support, and a spring for elevating the lower section and forcing the trolley wheel against the conductor, substantially as described.

16. The combination with a sub-way provided with a longitudinal groove or slot, and an electric conductor supported within the sub-way at one side of the groove or slot; of the supporting frame of a vehicle, a trolley wheel movable along the conductor within the sub-way, a support for the trolley wheel consisting of an upper section composed of a division fixed to said supporting frame, and a second division reciprocally movable along the former division and provided with an internal chamber and a movable plate for permitting entrance to said chamber, and a lower section having one end flexibly connected to the second division of the former section and its opposite end guided in the groove or slot and provided with an upturned extremity carrying the trolley wheel, means for reciprocating the movable division of the former section of said support, a spring for elevating the lower section and forcing the trolley wheel against the conductor, a fuse arranged within the chamber of the movable division of the upper section of said support, and the opposite sections of a conductor extending from the trolley wheel along said support and connected to the fuse, substantially as specified.

In testimony whereof I have hereunto signed my name, in the presence of two attesting witnesses, at Rochester, in the county of Monroe, in the State of New York, this 29th day of May, 1894.

FRANK E. BUTTON.

Witnesses:
HAMPDEN HYDE,
CLARK H. NORTON.